US012595186B2

(12) United States Patent
Liang et al.

(10) Patent No.: US 12,595,186 B2
(45) Date of Patent: Apr. 7, 2026

(54) METHOD FOR PREPARING CUPROUS CHLORIDE BY HIGH-VALUE UTILIZATION OF CHLORIDE ION-CONTAINING WASTERWATER

(71) Applicant: Jiangsu University of Technology, Changzhou (CN)

(72) Inventors: Guobin Liang, Changzhou (CN); Wei Lin, Changzhou (CN); Xiafei Yin, Changzhou (CN); Quanfa Zhou, Changzhou (CN); Juan Wu, Changzhou (CN)

(73) Assignee: Jiangsu University of Technology, Changzhou (CN)

( * ) Notice: Subject to any disclaimer, the term of this patent is extended or adjusted under 35 U.S.C. 154(b) by 502 days.

(21) Appl. No.: 18/221,356

(22) Filed: Jul. 12, 2023

(65) Prior Publication Data

US 2023/0365426 A1     Nov. 16, 2023

Related U.S. Application Data

(63) Continuation of application No. PCT/CN2022/112968, filed on Aug. 17, 2022.

(30) Foreign Application Priority Data

Sep. 13, 2021     (CN) .......................... 202111068623.9

(51) Int. Cl.
*C01G 3/05*     (2006.01)
*C02F 1/52*     (2023.01)
(Continued)

(52) U.S. Cl.
CPC .............. *C01G 3/05* (2013.01); *C02F 1/5236* (2013.01); *C02F 1/66* (2013.01); *C02F 2103/34* (2013.01);
(Continued)

(58) Field of Classification Search
None
See application file for complete search history.

(56) References Cited

U.S. PATENT DOCUMENTS 4,005,174 A     1/1977   Bodson
2002/0136685 A1*  9/2002  Huato ................. C22B 15/0089
                                                  423/604
(Continued)

FOREIGN PATENT DOCUMENTS

CN          101285119 A        10/2008
CN          103993173 A         8/2014
(Continued)

*Primary Examiner* — John J Figueroa
(74) *Attorney, Agent, or Firm* — IPRO, PLLC; Na Xu

(57) ABSTRACT

The disclosure discloses a method for preparing cuprous chloride by high-value utilization of chloride ion-containing wastewater, belonging to the field of wastewater treatment. According to the disclosure, wastewater containing chloride ions is taken, and the pH is maintained at 2 to 3.5. Cuprous oxide is added by 50 to 80% of a theoretical amount of the cuprous oxide according to a Cl⁻ concentration for reaction 8 to 15 min. Centrifugation is performed to obtain crude cuprous chloride and supernatant. Cuprous oxide is added to the resulting supernatant for reaction 8 to 15 min, and a total of cuprous oxide added in two reactions accounts for 90 to 100% of the theoretical amount. Centrifugation is performed after the reaction to obtain crude cuprous chloride. According to the method of the disclosure, the amount of cuprous oxide used is greatly reduced, and the purity of the cuprous chloride is improved.

10 Claims, 1 Drawing Sheet

(51) Int. Cl.
 *C02F 1/66* (2023.01)
 *C02F 103/34* (2006.01)
(52) U.S. Cl.
 CPC ...... *C02F 2209/02* (2013.01); *C02F 2209/06*
 (2013.01)

(56) References Cited

U.S. PATENT DOCUMENTS

2006/0006115 A1 1/2006 Hsien et al.
2023/0357038 A1* 11/2023 Lin ......................... C01G 3/04

FOREIGN PATENT DOCUMENTS

| CN | 109371259 | A | | 2/2019 | |
|----|-----------|---|---|--------|---|
| CN | 112062148 | A | | 12/2020 | |
| CN | 113526747 | A | | 10/2021 | |
| CN | 113800677 | A | | 12/2021 | |
| JP | 2005047776 | A | | 2/2005 | |
| JP | 2017039120 | A | * | 2/2017 | ............... C02F 1/58 |

* cited by examiner

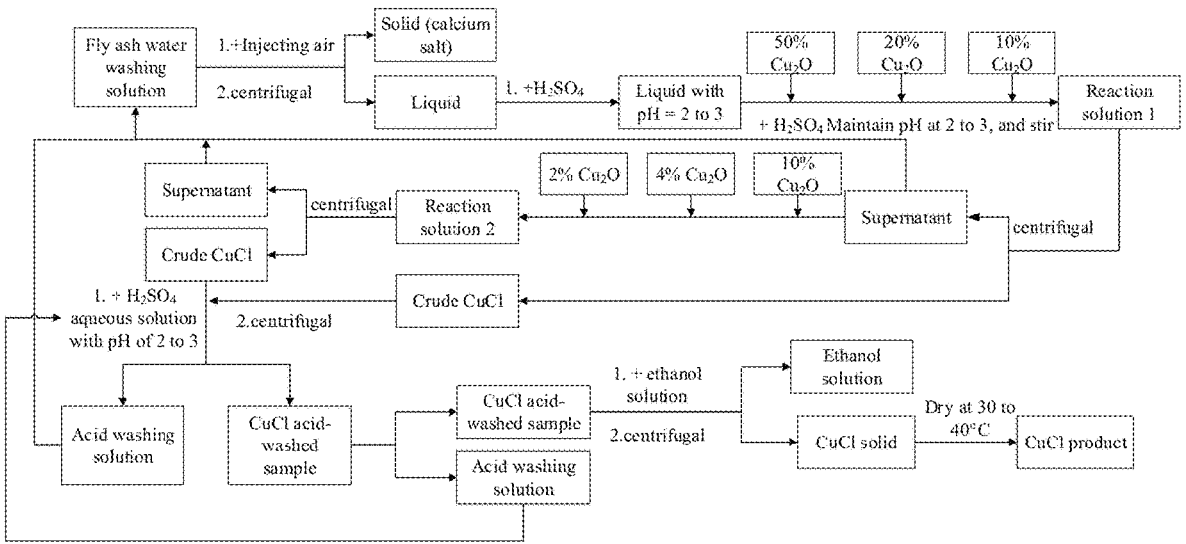

METHOD FOR PREPARING CUPROUS CHLORIDE BY HIGH-VALUE UTILIZATION OF CHLORIDE ION-CONTAINING WASTERWATER

TECHNICAL FIELD

The disclosure relates to a method for preparing cuprous chloride by high-value utilization of chloride ion-containing wastewater, belonging to the field of wastewater treatment.

BACKGROUND

With the acceleration of urbanization, the overall scale of household garbage incineration has sharply increased. The output of fly ash is about 30,000 tons per day. The fly ash contains a large number of toxic substances such as chloride salts, heavy metal and dioxins. At present, treatment of the fly ash mainly relies on stabilized landfill. Due to the problems of large capacity increase and poor long-term stability in solidified/stabilized landfill, there is an urgent need to develop a fly ash disposal technology with large capacity reduction, thorough hazard-free treatment and high resource recovery degree, thereby achieving clean treatment and resourceful utilization of the toxic substances such as the chloride salts, the heavy metal and the dioxins.

Main components of incineration fly ash are calcium oxide, silicon oxide and other substances, which are similar to cement components, and thus, the incineration fly ash can replace part of cement. Therefore, there is a technology for further treatment of the fly ash by incorporating the incineration fly ash into the cement in the prior art. However, the fly ash generated by incineration contains a large amount of chloride ions, which will cause the following hazards when incorporated into the cement: (1) corrosion attack: the chloride ions in a solution can damage passivation films on metal and alloy surface layers to varying degrees, such that intergranular corrosion, crevice corrosion, pitting corrosion and the like are produced thereon, which affects normal operation of industrial equipment and poses safety hazards; (2) influence on normal lifespan of buildings: when the content of the chloride ions in concrete is relatively high, steel bars therein will be corroded, such that the concrete will be expanded and loosened, thereby reducing its resistance to chemical corrosion, wear resistance and strength, and damaging a building structure; and (3) toxicity to human bodies: the fly ash with high chlorine content will cause toxic reactions to human metabolism, trachea, skin and other aspects of workers during subsequent treatment, and can even cause cancer in severe cases.

There are other methods for treatment of the chloride ions in the fly ash. For example, using the characteristic that the water solubility of the chloride ions is high, most of the chloride ions can be washed out by water washing, but further treatment of chlorine-containing wastewater is still needed. At present, commonly used treatment methods for the chlorine-containing wastewater include ion exchange methods, evaporation concentration methods, chemical precipitation methods and electrochemical methods. In an adsorption process of ion exchange resin, there are problems that a pipeline is prone to block, adsorption and desorption endpoints cannot be accurately determined timely, and energy consumption of the evaporation concentration and electrochemical methods is high, which is not suitable for large-scale wastewater treatment. The chemical precipitation methods include a silver precipitation method, a calcium chloroaluminate method and a copper powder method.

A silver raw material is expensive, and the dosage of calcium chloroaluminate is difficult to control, so that these methods are still in a research stage.

There is also a process of removing the chloride ions by cuprous oxide in the prior art, but the amount of cuprous oxide used for chlorine removal is relatively large, which is generally 2 to 6 times a theoretical amount of cuprous oxide. In a case that the cuprous oxide is sufficiently excessive, a chlorine removal effect of 96% or even higher can be achieved. A resulting mixture of cuprous oxide and cuprous chloride is treated with caustic soda to obtain cuprous hydroxide, and the cuprous hydroxide is dehydrated at high temperature to obtain the cuprous oxide for reuse. However, a cuprous compound is extremely unstable, which is prone to dismutation when pH is too low, and is prone to oxidation when the pH is too high. Moreover, due to excessive products, severe losses are caused in processes such as treatment with the caustic soda and high-temperature drying for reuse. In addition, the chloride ions actually generate a large amount of sodium chloride waste salts, which still needs further treatment. Although an effect of recycling is achieved, the economic value is small.

In general, various chlorine removal methods at present mainly focus on enrichment concentration for further treatment, and have the problems of high cost and poor effect. A chlorine ion treatment technology is still lacking, and there is an urgent need to develop more green and effective chlorine removal methods.

SUMMARY

A purpose of the disclosure is to solve the problems of high cost and poor effect of a chlorine removal method in the prior art, and especially that a process of removing chloride ions by using cuprous oxide has the problems that the amount of the cuprous oxide used for chlorine removal is large, the recovery rate is low and waste is severe.

Based on this, the disclosure provides a method for preparing cuprous chloride by high-value utilization of chloride ion-containing wastewater. Specifically, fly ash undergoes solid-liquid separation after acid leaching to obtain an acid leaching solution. Then cuprous oxide, serving as a chlorine binder, is added to the fly ash acid leaching solution. Step-by-step treatment is performed to obtain high-purity cuprous chloride with certain value. According to the method of the disclosure, the amount of cuprous oxide used is greatly reduced, and the cost of chloride ion treatment is greatly reduced; at the same time, the purity of the cuprous chloride is improved, such that resourceful utilization of the chloride ions is achieved, and economic benefits are improved.

Specifically, the disclosure provides a method for preparing cuprous chloride by high-value utilization of chloride ion-containing wastewater, and the method includes the following steps:

(1) primary reaction: taking wastewater containing chloride ions and adjusting the pH to 2 to 3.5; then, adding 50 to 80% of a theoretical amount of cuprous oxide according to a $Cl^-$ concentration; maintaining the pH at 2 to 3.5 during this period; reacting with stirring for 8 to 15 min after the addition of the cuprous oxide; and performing centrifugation after the reaction to obtain crude cuprous chloride and supernatant, the supernatant being to be subjected to a secondary reaction;

(2) secondary reaction: adding cuprous oxide to the supernatant obtained in step (1), with a total of cuprous oxide added in both the primary reaction and the secondary reaction accounting for 90 to 100% of the theoretical amount; maintaining the pH at 2 to 3.5 during this period; reacting with stirring for 8 to 12 min after the addition of the cuprous oxide; and performing centrifugation after the reaction to obtain crude cuprous chloride; and (3) performing acid washing, ethanol washing and drying on the crude cuprous chloride obtained in step (1) and step (2).

In an embodiment of the disclosure, the high-value utilization refers to: a process of waste resourceful treatment and recycling.

In an embodiment of the disclosure, the wastewater containing chloride ions includes any wastewater containing chloride ions, such as a fly ash water washing solution obtained from incineration of garbage, a copper electrolyte, etc.

In an embodiment of the disclosure, the concentration of chloride ions in the wastewater containing chloride ions is 10 to 100 g/L.

In an embodiment of the disclosure, when the wastewater containing chloride ions is alkaline (such as the fly ash water washing solution), prior to adjusting the pH to 2 to 3, it is preferable to firstly treat the wastewater by introducing air into a wastewater system for 2 to 4 h to reduce the pH to 7 to 7.5, which not only can reduce the amount of acid subsequently used, but also can absorb a $CO_2$ gas in the air, thereby reducing the content of greenhouse gases.

In an embodiment of the disclosure, a process of adjusting the pH is preferably implemented by adding sulfuric acid.

In an embodiment of the disclosure, the concentration of the sulfuric acid is 2 to 8 mol/L.

In an embodiment of the disclosure, the sulfuric acid is continuously added to maintain the pH of the system constant between 2 and 3.5.

In an embodiment of the disclosure, reaction with stirring preferably occurs at room temperature. The room temperature ranges from 10 to 40° C.

In an embodiment of the disclosure, the cuprous oxide can be commercially available or is prepared by the following methods: an anodic oxidation electrolysis method and a glucose reduction method.

In an embodiment of the disclosure, in step (1), the cuprous oxide is preferably added in portions, preferably in 3 to 5 portions, in the process of the primary reaction.

In an embodiment of the disclosure, in step (2), the cuprous oxide is preferably added in portions, preferably in 3 to 5 portions, in the process of the secondary reaction.

In an embodiment of the disclosure, the cuprous oxide is added in 3 to 5 times with an interval of 0.5 to 1 min. When added in 3 times, the cuprous oxide of 10 to 70%, 10 to 70% and 10 to 70% of an addition amount in this reaction is added in sequence. When added in 4 times, the cuprous oxide of 10 to 60%, 10 to 60%, 10 to 60% and 10 to 60% of the addition amount in this reaction is added in sequence. When added in 5 times, the cuprous oxide of 10 to 50%, 10 to 50%, 10 to 50%, 10 to 50% and 10 to 50% of the addition amount in this reaction is added in sequence.

In an embodiment of the disclosure, in step (1), the reaction preferably occurs in an oxygen-free environment in the process of the primary reaction.

In an embodiment of the disclosure, in step (2), the reaction preferably occurs in the oxygen-free environment in the process of the secondary reaction.

In an embodiment of the disclosure, in step (3), the acid washing includes: adding a certain volume of sulfuric acid solution with pH=2 to 3 to wash the crude cuprous chloride, performing centrifugation again, and repeating the operations 1 to 3 times to obtain acid-washed cuprous chloride.

In an embodiment of the disclosure, in step (3), the ethanol washing includes: adding a certain volume of anhydrous ethanol to further wash the resulting acid-washed cuprous chloride, performing centrifugation, and repeating the operations 1 to 2 times to obtain ethanol-washed cuprous chloride.

In an embodiment of the disclosure, in step (3), the drying includes: placing the resulting ethanol-washed cuprous chloride into a vacuum drying oven, and performing drying at 30 to 100° C. for 30 to 120 min to obtain a cuprous chloride product.

In an embodiment of the disclosure, the supernatant obtained from centrifugation in step (2) can be used as process water such as water for washing wastewater.

The disclosure further provides a fly ash treatment method. The method includes washing fly ash with water to obtain a fly ash water washing solution, and then performing treatment by using the above-mentioned approach of treating chlorine-containing wastewater.

In an embodiment of the disclosure, the fly ash refers to incineration fly ash, and specifically refers to captures of a flue gas purification system, and bottom ash settled at bottoms of a flue and chimney.

The disclosure further provides a method of garbage treatment. The method includes incinerating garbage, washing the resulting fly ash with water to obtain a fly ash water washing solution, and then performing treatment by using the above-mentioned approach of treating chlorine-containing wastewater.

According to the disclosure, the cuprous oxide is used as an antichlor, and chlorine removal is performed by combining two reactions. As a result, a final overall chlorine removal effect can reach 96%, and a cuprous chloride product with the purity of 95% or above can be obtained. The chlorine removal treatment of the chlorine-containing wastewater is realized, and the resulting cuprous chloride can be sold as a by-product, thereby improving economic benefits.

According to the disclosure, the amount of cuprous chloride used in the method of the disclosure is greatly reduced by improving the process (two-step reaction, pH stability maintaining, portion-wise addition and oxygen-free operation). The removal of chloride ions can be achieved by using only 90 to 100% of the theoretical amount of cuprous oxide, and the dosage of cuprous oxide is greatly reduced in comparison with the prior art, which is of great significance.

BRIEF DESCRIPTION OF FIGURES

FIG. 1 is a flowchart of removing chlorine with cuprous oxide according to the disclosure.

DETAILED DESCRIPTION

Determination of chloride ions and calculation formula for chlorine removal rate: LEI-Cl PXSJ-216F ion meter $$\omega_1 = \frac{c1v1 - c2v2}{c1v1} \times 100\%. \qquad \text{Formula (1)}$$

In Formula (1), c1 and v1 represent the Cl⁻ concentration and volume of an initial solution, while c2 and v2 represent the Cl⁻ concentration and volume of a chlorine-removed solution.

Determination method of purity of cuprous chloride: performing determination according to a method in the GB/T 27562-2011 "Industrial Cuprous Chloride" standard, while performing verification with ICP; and performing characterization of cuprous chloride by XRD.

Calculation formula of yield of cuprous chloride:

$$\frac{m2}{m1} \times 100\%. \qquad \text{Formula (2)}$$

In Formula (2), m2 represents the total mass of a product, and m1 represents the total mass of input cuprous oxide.

The disclosure will be further described in conjunction with examples, but the embodiments of the disclosure are not limited thereto.

The chlorine-containing wastewater is a fly ash water washing solution, which is from a garbage incineration plant company in Jiangsu, with the chloride ion concentration of 0.8 to 1.5 mol/L.

Preparation method of cuprous oxide: glucose reduction method: with intense stirring, 10 mL of glucose solution with the concentration of 50 g/L is added to 50 mL of copper acetate solution with the concentration of 10 g/L and stirring is performed for 10 min. Then, 25 mL of sodium hydroxide solution with the concentration of 20 g/L is added to the mixture at 70° C. and stirring is kept for 1 h. Centrifugation is performed to obtain a product, the product is rinsed 3 times with deionized water and anhydrous ethanol (centrifuge speed 11000 r/min), and vacuum drying is performed on the product at 60° C. to a constant weight.

Electrolysis method: a copper plate is used as an anode, a titanium mesh is used as a cathode, a salt solution is used as an anode electrolyte, CTAB (hexadecyl trimethyl ammonium bromide) is used as an additive, and a sodium hydroxide solution is used as a cathode. In a reaction process, the anode solution needs to be continuously stirred, and a surface current density during the reaction is controlled to be 30, 40 and 50 A/m². After 1 h of reaction, an anodic precipitate is separated, rinsed, filtered, and dried to obtain a finished cuprous oxide product.

Example 1

(1) Primary reaction: preparation of crude cuprous chloride: 100 ml of fly ash water washing solution (Cl⁻ concentration of 30 g/L) was taken. Air was introduced into a system for 4 h. In a case where it was detected that pH was around 7, sulfuric acid was dropwise added until pH was 2.5. After that, $Cu_2O$ was added in portions (added in three portions by 62.5%, 25% and 12.5% of the addition amount in sequence, with an interval of 1 min) by 50%, 60%, 70%, 80%, 90%, 100% and 120% (corresponding to NaCl: $Cu_2O$=1:0.25, 1:0.3, 1:0.35, 1:0.4, 1:0.45, 1:0.5 and 1:0.6, respectively) of a theoretical addition amount of cuprous chloride (6.05 g). During this period, the sulfuric acid was continuously added to maintain the pH at around 2.5. Stirring was performed at room temperature for 10 min. Centrifugation was performed after the reaction to obtain crude cuprous chloride and supernatant. The crude cuprous chloride was subjected to post-treatment. The supernatant was to be subjected to a secondary reaction.

(2) Secondary reaction: the supernatant obtained in step (1) was taken. $Cu_2O$ was added such that the total addition amount in step (1) and step (2) was 96% or 100% of the theoretical addition amount (added in three portions, the same as the primary reaction). The primary reaction was repeated with same steps. After the reaction, crude cuprous chloride was obtained, and was merged with the crude cuprous chloride obtained from the primary reaction.

(3) Product post-treatment: acid washing: 80 mL of sulfuric acid solution with pH=2.6 was added to wash the above-mentioned crude product, centrifugation was performed again, and the operations were repeated twice to obtain acid-washed cuprous chloride. Ethanol washing: 80 ml of anhydrous ethanol was added to further wash the above-mentioned cuprous chloride, centrifugation was performed, and the operations were repeated twice to obtain ethanol-washed cuprous chloride. Drying: the above-mentioned cuprous chloride was placed in a vacuum drying oven and dried at 45° C. for 60 min to obtain a cuprous chloride product. Supernatant of residual chlorine can be reused for washing fly ash.

The results of the primary reaction in this example are shown in Table 1. Comprehensively considering influencing factors of product purity and yield, when NaCl:$Cu_2O$≥1:0.5, although there was a certain improvement in chlorine removal effect, the purity of the product cuprous chloride significantly decreased. Therefore, it was preferable that addition was performed by NaCl:$Cu_2O$=1:0.25 to 0.45, i.e., by 50 to 90% of the theoretical amount of $Cu_2O$ in the primary reaction, and remaining chloride ions were left for the secondary reaction.

TABLE 1

| Influence of Molar Ratio of Primary Reaction on Chlorine Removal Effect and Cuprous Chloride | | | | | | | |
| --- | --- | --- | --- | --- | --- | --- | --- |
| NaCl:$Cu_2O$ | 1:0.25 | 1:0.3 | 1:0.35 | 1:0.4 | 1:0.45 | 1:0.5 | 1:0.6 |
| Chlorine removal rate (%) | 48.39 | 58.18 | 68.13 | 76.24 | 84.75 | 88.87 | 89.66 |
| Product purity (%) | 98.15 | 98.04 | 98.18 | 98.14 | 95.03 | 85.46 | 78.38 |
| Product yield (%) | 83.13 | 83.63 | 85.9 | 87.8 | 86.39 | 88.52 | 90.63 |

Reaction conditions: initial Cl⁻ (30 g/L), pH value=2.5, room temperature, 10 min, and stirring speed 400 r/min.

The chlorine removal effect obtained from the secondary reaction is shown in Table 2. Compared with Table 1, it can be seen that in a case of the same addition amount as the first time of addition (or even less, the addition amount was 100% or 120% in one reaction, while the total added amount in two reactions was 96%), the cuprous oxide was added in two times to obtain a better chlorine removal effect and higher product concentration. Taking 80%+20% as an example, the purity of the final resulting product cuprous chloride could reach 97% or above and the chlorine removal rate could also reach as high as 95.8%, which was significantly higher than an effect of adding the cuprous oxide by 100% once (the purity of the cuprous chloride was 85.46%, and the chlorine removal rate was 88.87%). Therefore, the method of adding the cuprous oxide in the two reactions was selected to treat water-washed fly ash water. Furthermore, it can be seen from Table 2 that when the addition amount in the primary reaction was 50% to 80% (the addition amount in the corresponding secondary reaction was 50% to 20%), it can be obtained that the chlorine removal effect was 95% or above and the purity of the cuprous chloride product was 97% or above. Taking 80%+20% as an example, when the cuprous oxide was added in an appropriate small amount (16%) for the second time, although the chlorine removal rate would be slightly reduced, the product purity could be slightly improved. Therefore, in order to reduce costs, a 80%+16% dosing manner was preferred.

TABLE 2

| Influence of Molar Ratio of Secondary Reaction on Chlorine Removal Effect and Cuprous Chloride | | | | | | |
|---|---|---|---|---|---|---|
| NaCl:Cu$_2$O | 1:0.25 | 1:0.2 | 1:0.15 | 1:0.1 | 1:0.08 | 1:0.05 |
| Corresponding primary reaction | 1:0.25 | 1:0.3 | 1:0.35 | 1:0.4 | 1:0.4 | 1:0.45 |
| Chlorine removal rate (%) | 48.63 | 38.91 | 29.36 | 19.56 | 18.86 | 9.85 |
| Product purity (%) | 96.05 | 96.39 | 96.14 | 96.26 | 96.61 | 92.14 |
| Product yield (%) | 91.25 | 91.42 | 90.89 | 90.52 | 89.53 | 89.21 |

Reaction conditions: initial Cl⁻ (30 g/L), pH value=2.5, room temperature, 10 min, and stirring speed 400 r/min.

Example 2

Taking Example 1 of adding by 80% in the primary reaction and adding by 16% in the secondary reaction as an example, the time of a reaction with stirring was changed to 2, 5, 8, 10 (Example 1), 12 and 15 min. Other operating steps were the same as those in Example 1. The results are shown in Table 3. It can be seen that when the reaction stirring time was 10 to 15 min, not only could the chlorine removal rate be ensured, but also it could be ensured that the purity of the cuprous chloride was not less than 96%. An optimal reaction effect was achieved at about 10 min. After that, a further reaction might lead to release of chloride ions and oxidation and dismutation of cuprous ions, such that the product purity was slightly reduced. It was most preferred that the time was controlled at 10 to 12 min.

TABLE 3

| Influence of Reaction Stirring Time on Overall Chlorine Removal Effect and Cuprous Chloride | | | | | | |
|---|---|---|---|---|---|---|
| T/min | 2 | 5 | 8 | 10 | 12 | 15 |
| Chlorine removal rate (%) | 62.19 | 82.74 | 90.64 | 95.10 | 95.10 | 92.47 |
| Product purity (%) | 67.42 | 84.95 | 93.10 | 97.89 | 97.55 | 96.54 |
| Product yield (%) | 94.92 | 92.43 | 89.34 | 88.1 | 87.5 | 87.7 |

Reaction conditions: initial Cl⁻ (30 g/L), pH value=2.5, room temperature, stirring speed 400 r/min, and adding by 80%+16%.

Example 3

Taking Example 1 of adding by 80% in the primary reaction and adding by 16% in the secondary reaction as an example, the reaction stirring speed in Example 1 was changed to 200 r/min and 600 r/min. Other operating parameters were consistent with those in Example 1. The results are shown in Table 4. It can be seen that the stirring speed had little influence on the product.

TABLE 4

| Influence of Stirring speed on Overall Portion-wise Chlorine Removal Effect and Cuprous Chloride | | | |
|---|---|---|---|
| r/min | 200 | 400 | 600 |
| Chlorine removal rate (%) | 95.02 | 95.10 | 95.05 |
| Product purity (%) | 97.73 | 97.89 | 97.84 |
| Product yield (%) | 88.6 | 88.1 | 88.3 |

Reaction conditions: initial Cl⁻ (30 g/L), pH value=2.5, room temperature, and reacting with stirring for 10 min.

Example 4

Taking Example 1 of adding by 80% in the primary reaction and adding by 16% in the secondary reaction as an example, the initial concentration of chloride ions in Example 1 was changed to 10, 40, 50 and 100 g/L, respectively. Other operating parameters were consistent with those in Example 1. The results are shown in Table 5.

It can be seen that the initial concentration of chloride ions shall not be too high. To ensure the product purity, the initial concentration shall be controlled to be 100 g/L or below, preferably not exceeding 50 g/L, and more preferably 30 g/L or below.

TABLE 5

| Influence of Cl⁻ Concentration on Overall Chlorine Removal Effect and Cuprous Chloride | | | | | |
|---|---|---|---|---|---|
| g/L | 10 | 30 | 40 | 50 | 100 |
| Chlorine removal rate (%) | 96.23 | 95.10 | 94.58 | 93.71 | 90.53 |
| Product purity (%) | 97.93 | 97.89 | 97.59 | 95.87 | 93.68 |
| Product yield (%) | 88.2 | 88.1 | 89.2 | 89.7 | 91.4 |

Reaction conditions: pH value=2.5, room temperature, 10 min, and stirring speed 400 r/min.

Example 5

(1) Primary reaction: preparation of crude cuprous chloride: 100 ml of fly ash water washing solution (Cl⁻ concentration of 30 g/L) was taken. Air was introduced into a system for 4 h. In a case where it was detected that pH was around 7, sulfuric acid was dropwise added until pH was 2.5. After that, Cu$_2$O (added at once) was added by 80% of the theoretical addition amount of cuprous oxide (6.05 g). During the period, the sulfuric acid was continuously added to maintain the pH at around 2.5. Stirring was performed at room temperature for 10 min. Centrifugation was performed after the reaction to obtain crude cuprous chloride and supernatant. The crude cuprous chloride was subjected to post-treatment. The supernatant was to be subjected to the secondary reaction.

(2) Secondary reaction: the supernatant obtained in step (1) was taken. $Cu_2O$ was added such that the total addition amount in step (1) and step (2) was 96% of the theoretical addition amount (added at once). The primary reaction was repeated with same steps. After the reaction, crude cuprous chloride was obtained, and was merged with a primary reaction product. The $Cl^-$ concentration decreased to 2.97 g/L after the supernatant reacted, and the chlorine removal effect reached 90.1%.

(3) Product post-treatment: acid washing: 80 ml of sulfuric acid solution with pH=2.6 was added to wash the above-mentioned crude product, centrifugation was performed again, and the operations were repeated twice to obtain acid-washed cuprous chloride. Ethanol washing: a certain volume of anhydrous ethanol was added to further wash the above-mentioned cuprous chloride, centrifugation was performed, and the operations were repeated twice to obtain ethanol-washed cuprous chloride. Drying: the above-mentioned cuprous chloride was placed in a vacuum drying oven and dried at 45° C. for 60 min to obtain 5.15 g of cuprous chloride product, with a yield of 85.2%, and the that, $Cu_2O$ was added in portions (added in three portions by 62.5%, 25% and 12.5% of the addition amount in sequence, with an interval of 1 min) by theoretical $NaCl:Cu_2O=1:0.5$. During this period, the sulfuric acid was continuously added to maintain the pH or the sulfuric acid was added at once (the total amount of the sulfuric acid was consistent). Stirring was performed at room temperature for 10 min. Centrifugation was performed after the reaction to obtain crude cuprous chloride and supernatant. The crude cuprous chloride was subjected to post-treatment.

The results are shown in Table 6. It can be seen that in a case of the same amount of sulfuric acid, when the sulfuric acid was continuously added to maintain a stable state of the pH value of the system, a better chlorine removal effect and a higher-purity product can be obtained.

TABLE 6

| Comparison Between Addition at Once and Continuous Addition of Sulfuric Acid | | | | | | | |
|---|---|---|---|---|---|---|---|
| | pH value | | | | | | |
| | 0.5 | | 1 | | 1.5 | | 2 |
| | Sulfuric acid addition manner | | | | | | |
| | At once | Continuous addition | At once | Continuous addition | At once | Continuous addition | At once | Continuous addition |
| Chlorine removal rate (%) | 83.52 | 86.73 | 82.04 | 85.36 | 82.26 | 85.29 | 76.42 | 78.94 |
| Product purity (%) | 73.95 | 80.52 | 79.31 | 85.25 | 78.25 | 85.46 | 71.28 | 77.53 |
| Product yield (%) | 86.63 | 84.31 | 87.41 | 85.51 | 88.42 | 85.37 | 89.63 | 93.73 | product purity was determined to be 95.16%. A reaction solution was merged for water washing of fly ash.

Example 6

Taking Example 1 of adding by 80% in the primary reaction and adding by 16% in the secondary reaction as an example, a stirring reaction process was performed in an oxygen-free environment (protected by introducing nitrogen gas). Other operating steps and parameters were the same as those in Example. The results showed that after the supernatant reacted, the concentration of $Cl^-$ decreased to 1.41 g/L, and the chlorine removal effect reached 95.3%. 5.40 g of cuprous chloride product was obtained, with a yield of 89.4%, and the product purity was determined to be 98.56%. It can be seen that the oxygen-free environment can slightly improve the treatment effect, but the improvement is not significant.

Example 7

Preparation of crude cuprous chloride: 100 ml of fly ash water washing solution ($Cl^-$ concentration of 30 g/L) was taken. Air was introduced into a system for 4 h. In a case where it was detected that pH was around 7, sulfuric acid was dropwise added until pH was 0.5, 1, 1.5 and 2. After Reaction conditions: initial $Cl^-$ (30 g/L), molar ratio ($NaCl:Cu_2O=1:0.5$), room temperature, 10 min, and stirring speed 400 r/min. Note: Continuous adjustment refers to continuously add the amount of sulfuric acid, used for adjusting to 0.5 at once, in portions to keep the pH value of the system constant.

Example 8

Taking Example 1 of adding by 80% in the primary reaction and adding by 16% in the secondary reaction as an example, the pH was adjusted to 1, 1.5, 2, 2.5 (Example 1), 3 and 3.5. Other operating steps were the same as those in Example 1. The results are shown in Table 7. Comprehensively considering factors in two aspects of the chlorine removal effect and product purity, it was preferred that the pH of the system was continuously controlled to be 2 to 3.5, and most preferably 2 to 3.

TABLE 7

| Influence of pH Value on Secondary Overall Reaction | | | | | |
|---|---|---|---|---|---|
| pH value | 1 | 1.5 | 2 | 2.5 | 3 | 3.5 |
| Chlorine removal rate (%) | 96.79 | 96.02 | 95.84 | 95.10 | 94.98 | 93.29 |

TABLE 7-continued

| Influence of pH Value on Secondary Overall Reaction | | | | | |
|---|---|---|---|---|---|
| pH value | 1 | 1.5 | 2 | 2.5 | 3 | 3.5 |
| Product purity (%) | 86.54 | 94.21 | 97.32 | 97.89 | 97.73 | 97.32 |
| Product yield (%) | 87.42 | 86.75 | 86.3 | 88.1 | 88.26 | 88.28 |

Reaction conditions: initial Cl⁻ (30 g/L), room temperature, 10 min, stirring speed 400 r/min, adding by 80% in the primary reaction and adding by 16% in the secondary reaction.

Example 9

Taking Example 1 of adding by 80% in the primary reaction and adding by 16% in the secondary reaction as an example, the chlorine-containing wastewater in Example 1 was changed to a copper electrolyte for preparing cuprous oxide, with the chloride ion content of 49.7 g/L and no air was needed to be introduced. Other operating parameters were consistent with those in Example 1. The cuprous oxide was added in portions by 80%+16% of the theoretical addition amount of cuprous oxide (10.02 g). After the supernatant reacted, the Cl⁻ concentration decreased to 2.2 g/L, and the chlorine removal effect reached 95.2%. 8.95 g of cuprous chloride product was obtained, with a yield of 89.3%, and the product purity was determined to be 98.63%. This indicates that this method is not only applicable to the fly ash water washing solution, but also applicable to the treatment of other chlorine-containing wastewater.

Example 10

Taking Example 1 of adding by 80% in the primary reaction and adding by 16% in the secondary reaction as an example, the cuprous oxide was added in portions (added in 3 to 5 times with an interval of 0.5 to 1 min; when added in 3 times, 10 to 70%, 10 to 70% and 10 to 70% of cuprous oxide were added in sequence; when added in 4 times, 10 to 60%, 10 to 60%, 10 to 60% and 10 to 60% of cuprous oxide were added in sequence; and when added in 5 times, 10 to 50%, 10 to 50%, 10 to 50%, 10 to 50% and 10 to 50% of cuprous oxide were added in sequence) in the processes of the primary reaction and the secondary reaction. Other operating parameters were the same as those in Example 1.

After testing, the chlorine removal rate reached 95% or above, the yield of the cuprous chloride was 88% or above, and the purity was 97% or above.

TABLE 8

| Influence of Number of Times of Portion-wise Addition on Secondary Overall Reaction | | | |
|---|---|---|---|
| Number of times | 3 | 4 | 5 |
| Chlorine removal rate (%) | 95.10 | 95.12 | 95.09 |
| Product purity (%) | 97.89 | 97.88 | 97.90 |
| Product yield (%) | 88.10 | 88.12 | 88.10 |

Reaction conditions: initial Cl⁻ (30 g/L), room temperature, 10 min, stirring speed 400 r/min, adding by 80% in the primary reaction and adding by 16% in the secondary reaction. When added in three times, the cuprous chloride was respectively added by 62.5%, 25% and 12.5% of the required addition amount, with an interval of 1 min. When added in four times, the cuprous chloride was respectively added by 50%, 25%, 12.5% and 12.5% of the required addition amount, with an interval of 1 min. When added in five times, the cuprous chloride was added respectively by 30%, 30%, 20%, 10% and 10% of the required addition amount, with an interval of 0.5 min.

Although the disclosure has been disclosed with preferred examples, it is not intended to limit the disclosure. Anyone familiar with this technology can make various modifications and modifications, without departing from the spirit and scope of the disclosure. Therefore, the scope of protection of the disclosure should be based on the scope defined in claims.

What is claimed is:

1. A method for preparing cuprous chloride by high-value utilization of chloride ion-containing wastewater, wherein the method comprises the following steps:
   (1) primary reaction: taking wastewater containing chloride ions and adjusting the pH to 2 to 3.5; then, adding 50% to 80% of a theoretical amount of cuprous oxide according to a Cl⁻ concentration, and maintaining the pH at 2 to 3.5 during this period; reacting with stirring for 8 to 15 minutes after the addition of the cuprous oxide; and performing centrifugation after the reaction to obtain crude cuprous chloride and supernatant, the supernatant is to be subjected to a secondary reaction;
   (2) secondary reaction: adding cuprous oxide to the supernatant obtained in step (1), with a total of cuprous oxide added in both the primary reaction and the secondary reaction accounting for 90% to 100% of the theoretical amount, and maintaining the pH between 2 and 3.5 during this period; reacting with stirring for 8 to 12 minutes after the addition of the cuprous oxide; and performing centrifugation after the reaction to obtain crude cuprous chloride; and
   (3) performing acid washing, ethanol washing and drying on the crude cuprous chloride obtained in step (1) and step (2).

2. The method for preparing cuprous chloride by high-value utilization of chloride ion-containing wastewater according to claim 1, wherein the concentration of chloride ions in the wastewater containing chloride ions is 10 to 100 g/L.

3. The method for preparing cuprous chloride by high-value utilization of chloride ion-containing wastewater according to claim 1, wherein the adjusting the pH to 2 to 3.5 is implemented by adding sulfuric acid, and the sulfuric acid is continuously added to maintain the pH of a system constant between 2 and 3.5.

4. The method for preparing cuprous chloride by high-value utilization of chloride ion-containing wastewater according to claim 1, wherein temperature of the reactions in step (1) and step (2) is 10 to 40° C.

5. The method for preparing cuprous chloride by high-value utilization of chloride ion-containing wastewater according to claim 1, wherein the cuprous oxide is added in portions in processes of the primary reaction and the secondary reaction.

6. The method for preparing cuprous chloride by high-value utilization of chloride ion-containing wastewater according to claim 5, wherein portion-wise addition comprises addition in 3 to 5 portions, with an interval of 0.5 to 1 minutes each time.

7. The method for preparing cuprous chloride by high-value utilization of chloride ion-containing wastewater according to claim 1, wherein in step (1), the reaction occurs in an oxygen-free environment in the process of the primary reaction or the secondary reaction.

8. The method for preparing cuprous chloride by high-value utilization of chloride ion-containing wastewater according to claim 1, wherein in step (3), the acid washing comprises: adding a certain volume of sulfuric acid solution with pH value between 2 to 3 to wash the crude cuprous chloride, performing centrifugation, and repeating the operations 1 to 3 times to obtain acid-washed cuprous chloride; the ethanol washing comprises: adding a certain volume of anhydrous ethanol to further wash the resulting acid-washed cuprous chloride, performing centrifugation, and repeating the operations 1 to 2 times to obtain ethanol-washed cuprous chloride.

9. A fly ash treatment method, wherein the method comprises washing fly ash with water to obtain a fly ash water washing solution, and then performing treatment by using the method for preparing cuprous chloride by high-value utilization of chloride ion-containing wastewater according to claim 1.

10. A method of garbage treatment, wherein garbage is firstly incinerated, then fly ash obtained after garbage incineration is washed with water to obtain a fly ash water washing solution, and then, treatment is performed by using the method for preparing cuprous chloride by high-value utilization of chloride ion-containing wastewater according to claim 1.

\* \* \* \* \*